US010761885B2

(12) United States Patent
Sideris et al.

(10) Patent No.: US 10,761,885 B2
(45) Date of Patent: Sep. 1, 2020

(54) APPARATUS AND METHOD OF EXECUTING THREAD GROUPS

(71) Applicant: ARM Limited, Cambridge (GB)

(72) Inventors: Isidoros Sideris, Cambridge (GB); Eugenia Cordero-Crespo, Bedford (GB); Amir Kleen, Hod Hasharon (IL)

(73) Assignee: ARM Limited, Cambridge (GB)

( * ) Notice: Subject to any disclaimer, the term of this patent is extended or adjusted under 35 U.S.C. 154(b) by 121 days.

(21) Appl. No.: 16/044,747

(22) Filed: Jul. 25, 2018

(65) Prior Publication Data
US 2019/0073241 A1 Mar. 7, 2019

(30) Foreign Application Priority Data
Sep. 6, 2017 (GR) .............................. 20170100402

(51) Int. Cl.
G06F 9/48 (2006.01)
G06F 9/38 (2018.01)
(Continued)

(52) U.S. Cl.
CPC .......... *G06F 9/4881* (2013.01); *G06F 9/3005* (2013.01); *G06F 9/30058* (2013.01);
(Continued)

(58) Field of Classification Search
None
See application file for complete search history.

(56) References Cited

U.S. PATENT DOCUMENTS 7,353,369 B1 * 4/2008 Coon .................. G06F 9/30101
712/220
7,543,136 B1 6/2009 Coon et al.
(Continued)

FOREIGN PATENT DOCUMENTS
WO 2015/063451 5/2015

OTHER PUBLICATIONS
Search Report for GB1716642.2 dated Apr. 9, 2018, 4 pages.

Primary Examiner — Michael Sun
(74) Attorney, Agent, or Firm — Nixon & Vanderhye P.C.

(57) ABSTRACT

An apparatus and method are provided for executing thread groups. The apparatus comprises scheduling circuitry for selecting for execution a first thread group from a plurality of thread groups, and thread processing circuitry that is responsive to the scheduling circuitry to execute active threads of the first thread group in dependence on a common program counter shared between the active threads. In response to an exit event occurring for the first thread group, the thread processing circuitry determines whether a program counter check condition is present, and this can be used to trigger program counter checking circuitry to perform a program counter check operation to update the common program counter and an active thread indication for the first thread group. The thread processing circuitry is provided with register storage in which program counter information for each thread of the first thread group can be stored, and the program counter checking circuitry is arranged to have access to that register storage when performing the program counter check operation. Further, the scheduling circuitry is arranged to select, for execution by the thread processing circuitry, a different thread group whilst awaiting performance of the program counter check operation by the program counter checking circuitry for the first thread group. This provides an area efficient mechanism for handling divergence and re-convergence of threads within thread groups, in a manner that avoids impacting performance.

19 Claims, 8 Drawing Sheets

(51) Int. Cl.
  *G06F 9/30*    (2018.01)
  *G06F 9/32*    (2018.01)
  *G06F 9/46*    (2006.01)

(52) U.S. Cl.
  CPC .......... *G06F 9/30098* (2013.01); *G06F 9/321* (2013.01); *G06F 9/3851* (2013.01); *G06F 9/3887* (2013.01); *G06F 9/468* (2013.01)

(56) References Cited

U.S. PATENT DOCUMENTS

| | | | | |
|---|---|---|---|---|
| 7,861,060 B1* | 12/2010 | Nickolls | ................. | G06F 9/522 |
| | | | | 712/22 |
| 7,877,585 B1* | 1/2011 | Coon | .................... | G06F 9/3851 |
| | | | | 712/22 |
| 8,522,000 B2* | 8/2013 | Shebanow | .............. | G06F 9/327 |
| | | | | 712/225 |
| 9,547,530 B2* | 1/2017 | Mansell | ..................... | G06F 9/50 |
| 2009/0133033 A1* | 5/2009 | Lindo | ................. | G06F 11/0778 |
| | | | | 718/108 |
| 2009/0240931 A1 | 9/2009 | Coon et al. | | |
| 2012/0079241 A1* | 3/2012 | Dally | .................... | G06F 9/3851 |
| | | | | 712/205 |
| 2013/0061027 A1* | 3/2013 | Chen | ..................... | G06F 9/3887 |
| | | | | 712/234 |
| 2013/0117541 A1* | 5/2013 | Choquette | ............. | G06F 9/3851 |
| | | | | 712/214 |
| 2015/0026438 A1* | 1/2015 | Giroux | ..................... | G06F 9/38 |
| | | | | 712/225 |

* cited by examiner

| EXIT EVENT TYPE | DIVERGENT FLAG | |
| --- | --- | --- |
| | UNSET (EG0) | SET (EG1) |
| NORMAL | ✗ | ✗ |
| CONVERGENCE INDICATOR | ✗ | ✓ |
| BRANCH | OPTION 1 ✓ / OPTION 2 ? | ✓ |

✓ = PC CHECK TRIGGERED
✗ = PC CHECK NOT TRIGGERED
? = PRE-CHECK PERFORMED AND PC CHECK TRIGGERED IF REQUIRED

FIG. 5

EXAMPLE FLOW FOR THREAD GROUP X                                                              ⟵ 350

| | ACTIVE MASK | PENDING MASK | DIVERGENT FLAG | NEXT_PC | ACTIVE LANE PCs |
|---|---|---|---|---|---|
| ISSUE | 1111 | 0000 | 0 | 48 | |
| EXIT (BR) | 1111 | 0000 | 0 | LEAVE AT 48 | 128 128 96 96 |
| PC CHECK OPERATION * | 0011 | 1100 | 1 | 96 | |
| ISSUE | 0011 | 1100 | 1 | 96 | |
| EXIT (CONVERGENCE INDICATOR) | 0011 | 1100 | 1 | 128 | — — 128 128 |
| PC CHECK OPERATION * | 1111 | 0000 | 0 | 128 | |
| ISSUE | 1111 | 0000 | 0 | 128 | |
| EXIT (BR) | 1111 | 0000 | 0 | LEAVE AT 128 | 256 196 256 196 |
| PC CHECK OPERATION * | 0101 | 1010 | 1 | 196 | |

TIME ⟶

\* SCHEDULER CAN ISSUE FOR OTHER THREAD GROUPS WHILST PC CHECK OPERATION PERFORMED FOR THREAD GROUP X

FIG. 6

IF USE SCRATCHPAD

IF EXIT EVENT DUE TO BRANCH INSTRUCTION EXECUTION, THREAD PROCESSING CIRCUITRY WRITES TO SCRATCHPAD TARGET ADDRESS IF BRANCH TAKEN, TARGET ADDRESS IF BRANCH NOT TAKEN, AND INDICATION FOR EACH ACTIVE THREAD AS TO WHETHER BRANCH TAKEN OR NOT TAKEN — 500

PC CHECK TRIGGERED

CONSTRUCT PC FOR EACH ACTIVE THREAD FROM SCRATCHPAD CONTENTS, AND FOR PENDING THREADS READ THE PC VALUES FROM THE REGISTER FILE — 510

PROCEED AS PER STEPS IN FIGURE 4 (FROM STEP 220 ONWARDS) AND IN ADDITION, IF DIVERGENCE DETECTED, WRITE PC FOR EACH ACTIVE THREAD TO REGISTER FILE — 520

FIG. 8

APPARATUS AND METHOD OF EXECUTING THREAD GROUPS

This application claims priority to GR Patent Application No. 20170100402 filed Sep. 6, 2017, the entire contents of which are hereby incorporated by reference.

BACKGROUND

Technical Field

The present technique relates to an apparatus and method for executing thread groups, where each thread group comprises multiple threads.

Technical Background

It is known to arrange for the threads within a particular thread group to execute the same instructions, typically in relation to different data. In such a system, when a particular thread group is selected for issuance to thread processing circuitry, the instructions that each of the threads within the thread group are to execute can be fetched in dependence upon a common program counter shared between the threads. Often when the threads of a thread group are arranged to execute instructions in the above manner, the thread processing circuitry is referred to as adopting a Single Instruction Multiple Thread (SIMT) execution model.

When performing SIMT processing, it is possible for the program counter associated with each of the threads to diverge when those threads execute a branch instruction, due for example to some of the threads taking the branch whilst others do not. In SIMT systems, it is known to provide a mechanism to detect any such divergence, and then to allow subsequent processing of the threads to be restricted to a particular subset of the threads until such a point is reached where the threads are detected to re-converge. As the number of threads that execute together the same instruction increases, the mechanisms to diverge and re-converge the threads become more and more complex, and also become very expensive in terms of circuit area required to support that functionality. Further, they can introduce a performance impact, since in known systems it is typical for the divergence/re-convergence mechanism to be required to complete its checks before the thread processing circuitry can resume execution.

Accordingly, it would be desirable to provide an improved mechanism for handling thread divergence and re-convergence within such a data processing system.

SUMMARY

In one example configuration, there is provided an apparatus comprising: scheduling circuitry to select for execution a first thread group from a plurality of thread groups; thread processing circuitry, responsive to the scheduling circuitry, to execute active threads of the first thread group in dependence on a common program counter shared between the active threads; the thread processing circuitry being responsive to an exit event occurring for the first thread group, to determine whether a program counter check condition is present; the thread processing circuitry having register storage to store program counter information for each thread of the first thread group; and program counter checking circuitry having access to said register storage and, in the presence of said program counter check condition, to perform a program counter check operation to update the common program counter and an active thread indication for the first thread group; the scheduling circuitry being arranged to select, for execution by the thread processing circuitry, a second thread group from said plurality of thread groups other than said first thread group, whilst awaiting performance of the program counter check operation by the program counter checking circuitry for the first thread group.

In another example configuration, there is provided a method of executing thread groups on an apparatus having scheduling circuitry to select for execution a first thread group from a plurality of thread groups, and thread processing circuitry, responsive to the scheduling circuitry, to execute active threads of the first thread group in dependence on a common program counter shared between the active threads, the method comprising: determining, responsive to an exit event from the thread processing circuitry occurring for the first thread group, whether a program counter check condition is present; providing the thread processing circuitry with register storage to store program counter information for each thread of the first thread group; employing program counter checking circuitry, in the presence of said program counter check condition, to perform a program counter check operation to update the common program counter and an active thread indication for the first thread group, the program counter checking circuitry having access to said register storage during performance of the program counter check operation; and causing the scheduling circuitry to select, for execution by the thread processing circuitry, a second thread group from said plurality of thread groups other than said first thread group, whilst awaiting performance of the program counter check operation by the program counter checking circuitry for the first thread group.

In a yet further example configuration, there is provided an apparatus comprising: scheduling means for selecting for execution a first thread group from a plurality of thread groups; thread processing means for executing, in response to the scheduling means, active threads of the first thread group in dependence on a common program counter shared between the active threads; the thread processing means for determining, responsive to an exit event occurring for the first thread group, whether a program counter check condition is present; the thread processing means having register storage means for storing program counter information for each thread of the first thread group; and program counter checking means having access to said register storage means and, in the presence of said program counter check condition, for performing a program counter check operation to update the common program counter and an active thread indication for the first thread group; the scheduling means for selecting, for execution by the thread processing means, a second thread group from said plurality of thread groups other than said first thread group, whilst awaiting performance of the program counter check operation by the program counter checking means for the first thread group.

Further aspects, features and advantages of the present technique will be apparent from the following description of examples, which is to be read in conjunction with the accompanying drawings.

BRIEF DESCRIPTION OF THE DRAWINGS

FIG. 5 is a table illustrating how, in one embodiment, a decision is taken as to whether a program counter check operation is required, in dependence on the type of an exit event and the current status of a divergent flag;

FIG. 6 illustrates an example sequence of stages undertaken in relation to a particular thread group when adopting the approach of the described embodiments;

FIG. 8 is a flow diagram schematically illustrating an alternative embodiment where the program counter checking circuitry of FIG. 1 writes to the additional registers of the register file rather than the thread processing circuitry.

DESCRIPTION OF EXAMPLES

Figure 1:
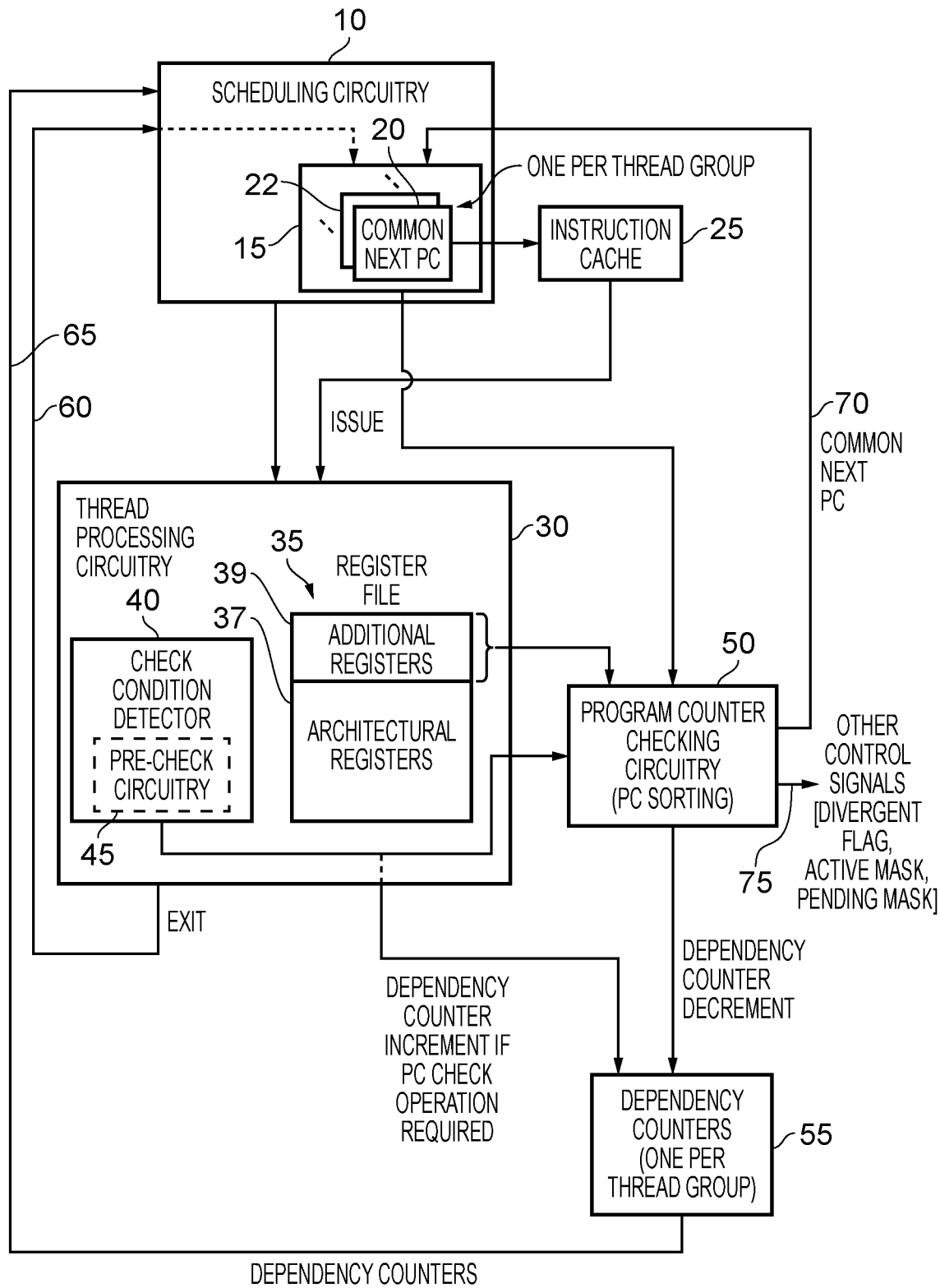
FIG. 1 is a block diagram of an apparatus in accordance with one embodiment.

Before discussing the embodiments with reference to the accompanying figures, the following description of embodiments is provided.

In one embodiment, an apparatus is provided that has scheduling circuitry to select, from amongst a plurality of thread groups, a thread group that is next to be executed. For the following discussion, that selected thread group will be referred to as a first thread group. The apparatus includes thread processing circuitry, that is responsive to the scheduling circuitry to execute active threads of the first thread group in dependence on a common program counter shared between the active threads. Whilst in some instances all of the threads of the thread group may be active, such that each thread is executed when that thread group is issued to the thread processing circuitry, at some points in time only a subset of the threads will actually be active threads, and information can be maintained to identify at any point in time which are the active threads of each thread group.

At some point during the execution of the first thread group, an exit event will occur, and at this point the thread processing circuitry is arranged to determine whether a program counter check condition is present. The apparatus further comprises program counter checking circuitry which, when the program counter check condition is determined to be present, can be triggered to perform a program counter check operation to update the common program counter and an active thread indication for the first thread group. During this process, the program counter check operation can require access to program counter information for each thread of the first thread group. In the described embodiments, this information is maintained in a very area efficient manner by providing the thread processing circuitry with register storage in which the program counter information for each thread of the first thread group can be stored, with the program counter checking circuitry being arranged to have access to that register storage.

Further, since the program counter checking circuitry can access the register storage for the information that it requires to perform the program counter check operation, there is no need for the thread processing circuitry to remain inactive whilst the program counter checking circuitry is performing the program counter check operation. Instead, in accordance with the described embodiments, the scheduling circuitry may be arranged to select, for execution by the thread processing circuitry, a different thread group (referred to herein as a second thread group) from the plurality of thread groups, whilst awaiting performance of the program counter check operation by the program counter checking circuitry for the first thread group. By such an approach, the operation of the program counter checking circuitry is placed off of the critical path, thereby allowing the thread processing circuitry to be used to make forward progress with regards to the processing of other thread groups whilst the program counter checking circuitry is performing the program counter check operation for the first thread group.

Such an approach has been found to provide a particularly area efficient mechanism for performing the program counter check operations required to detect divergence and/or convergence of threads within a thread group, whilst also being very efficient in terms of performance and power consumption. In particular, by using the register storage to maintain the program counter information for each thread (as will be discussed later, in one embodiment the register storage can be part of common register storage that provides both working registers for use as source and destination operands and additional registers to hold the program counter information), this can significantly reduce the area required when compared with mechanisms that use random access memory (RAM) storage structures or the like to maintain that information. Further, such an approach allows the thread processing circuitry to exit and be issued with useful work to perform for a different thread group, whilst the program counter checking circuitry then performs the program counter check operation off of the critical path. Since the program counter checking circuitry is off of the critical path, the time taken to perform the program counter check operation does not impact performance of the apparatus, assuming that in the interim there is useful work to be performed in respect of the other thread groups. This can give rise to a great deal of flexibility in the way in which the program counter checking circuitry is constructed.

The register storage can take a variety of forms but in one embodiment comprises at least one register for each thread group in said plurality of thread groups, to allow program counter information for each thread to be maintained for each of the plurality of thread groups. Hence, each thread group can be allocated one or more dedicated registers within the register storage for the storing of the associated program counter information, enabling program counter information for each thread of each of the thread groups to be maintained, and hence allowing the program counter checking circuitry to perform program counter check operations in respect of any of the thread groups, through access to the appropriate register(s) within the register storage.

The apparatus will typically comprise a register file comprising a plurality of registers that are specifiable by instructions executed for each thread. Such registers are often referred to as architectural registers, since they are visible to the programmer, and can be specified as source or destination registers for instructions. In one embodiment, the register storage is provided by extending the register file to include a number of additional registers that are unspecifiable by the instructions. Hence, these additional registers are not visible to the programmer model, and cannot be specified as source or destination registers by the instructions. In one embodiment, they are however treated as implicit destination registers when certain instructions are executed. For example, as will be discussed in more detail later, when an instruction flow changing instruction (such as a branch instruction) is executed, the appropriate register(s) for the current thread group can be set as a destination in which to write the computed program counter values for each thread resulting from the execution of that instruction flow changing instruction.

There are a number of situations that can give rise to the exit event being determined to be present. In one embodiment, the exit event is determined to be present at least in response to execution of an instruction flow changing instruction by the active threads of the first thread group. In one example, when the scheduling circuitry selects a thread group to be issued to the execution circuitry, a block of instructions may be retrieved from memory starting with a common program counter value, and if that block includes an instruction flow changing instruction, that instruction flow changing instruction can form the final instruction in the block. Accordingly, at a point in time where the instruction flow changing instruction is executed, this will indicate that the final instruction of the block has been executed, and accordingly the exit event is present.

In one embodiment, the thread processing circuitry is responsive to the execution of said instruction flow changing instruction to write into the register storage, for each active thread, a program counter value computed by executing said instruction flow changing instruction. Since an instruction flow changing instruction will not typically specify a destination register, its write slot for the register file can be used to write back the computed program counter values into the appropriate register(s) of the register storage (as mentioned earlier in one embodiment these registers are hidden registers within the register file that are not directly specifiable by the instructions). Hence, the writing of the program counter values to the register storage at this point does not incur any performance impact, since when executing the instruction flow changing instruction there would not typically be any other data that needs to be written to the register file.

In such embodiments where it is the execution of the instruction flow changing instruction that causes the computed program counter values to be written into the register storage, then the program counter checking circuitry merely needs to be given read access to the register storage during performance of the program counter check operation, so that it can retrieve the required information to enable it to perform the program counter check operation for the thread group. In particular, in one embodiment there is no need to give the program counter checking circuitry separate write access to the register storage, hence avoiding the need to provide a separate write port for the program counter checking circuitry.

There are a number of ways in which the program counter check operation can be performed. However, in one embodiment the program counter checking circuitry may be arranged to perform the program counter check operation by evaluating the program counter associated with each thread using a deterministic sorting rule, to determine a next program counter value and an indication of the threads whose program counter is at that next program counter value. In implementing the deterministic sorting rule, there is a great deal of flexibility as to how the program counter checking circuitry can be constructed, since as mentioned earlier the program counter checking circuitry is off of the critical path, and hence the throughput of the program counter checking circuitry can be traded off with the area required by the program counter checking circuitry. For example, the program counter checking circuitry may be constructed to adopt one of the following implementations dependent on a desired throughput:
 (i) to evaluate the program counter of all threads of the thread group in parallel;
 (ii) to perform an iterative sequence of evaluation steps, where a different subset of the program counters are evaluated in each iteration of the iterative sequence, and a result of the final iteration indicates the next program counter value and the threads whose program counter is at that next program counter value.

In particular, by arranging for the evaluation to be performed in parallel, the throughput of the program counter checking circuitry can be increased, but at the expense of requiring a relatively large area for the program counter checking circuitry. However, if it is desired to provide a more area efficient implementation, then the program counter checking circuitry can be arranged instead to perform the above described iterative sequence of evaluation steps. Whilst this means that the throughput is reduced, it can allow the area to be significantly reduced, and as mentioned earlier a reduction in the throughput can be readily accommodated without impacting the overall performance of the apparatus, provided that useful work can be performed in respect of other thread groups whilst the program counter checking circuitry is performing the program counter check operation for a particular thread group.

The deterministic sorting rule can be arranged in a variety of ways, but in one embodiment serves to determine a minimum program counter value and an indication of the threads whose program counter is at that minimum program counter value. That minimum program counter value can then be set as the next common program counter that will be shared between the active threads when the scheduling circuitry subsequently selects that same thread group for execution by the thread processing circuitry.

There are a number of ways in which divergence in the threads of the thread group can be tracked, but in one embodiment the program counter checking circuitry is arranged to set a divergent flag when performance of the program counter check operation indicates that the threads of the first thread group have diverged. The state of this divergent flag can be made available to other components within the apparatus, so that at any point in time it can be identified whether the thread group currently being processed by the thread processing circuitry is presently in a divergent state or not. As will be discussed in more detail later, this can be used for example to determine in certain situations whether a program counter check operation is required or not.

The exit event can occur for a variety of reasons, but in one embodiment the exit event occurs at least when the thread processing circuitry completes execution of an allocated block of code for the first thread group, a currently executed instruction is an instruction flow changing instruction, and/or a convergence indicator is associated with the currently executed instruction.

Hence, if an allocated block of code does not include an instruction flow changing instruction, and merely executes normally without any convergence indicator being associated with the final instruction in the block, the thread processing circuitry can merely exit processing of the thread group, and signal that exit event back to the scheduling circuitry, and the scheduling circuitry would then be free to select another block of code for that thread group to be executed by the thread processing circuitry. However, if instead the currently executing instruction is an instruction flow changing instruction, this indicates a situation where divergence is possible, and it may be necessary to perform a program counter check operation. Similarly, if a convergence indicator is associated with the currently executed instruction, this indicates a situation where it may be necessary to perform a program counter check operation to determine whether in fact a divergent thread group has now re-converged. The convergence indicator can be specified in a variety of ways. For instance, it can be a static indicator added for example by the compiler in association with certain lines of code, or in some embodiments can be set dynamically during execution. Purely by way of example, termination of all active threads that are in divergence can cause implicit reconvergence (to continue with the remaining threads).

Upon occurrence of the exit event, there are a number of ways in which the thread processing circuitry can determine whether the program counter check condition is present or not, and hence whether there is a need to perform a program counter check operation. In one embodiment, the thread processing circuitry may be arranged to determine that the program counter check condition is present when the divergent flag is set and either the currently executed instruction is an instruction flow changing instruction or the convergence indicator is associated with the currently executed instruction.

Hence, if divergence has already previously been detected, and the currently executed instruction is either an instruction flow changing instruction or has the convergence indicator associated with it, then in one embodiment the program counter check condition is determined to be present.

Further, in one embodiment the thread processing circuitry may be arranged to determine that the program counter check condition is present when the divergent flag is unset and the currently executed instruction is an instruction flow changing instruction. Hence, in this embodiment, the presence of the instruction flow changing instruction causes the program counter check condition to be determined to be present irrespective of whether the divergent flag is currently unset or set.

However, in an alternative embodiment, the thread processing circuitry may comprise pre-check circuitry arranged, when the divergent flag is unset and the currently executed instruction is an instruction flow changing instruction, to perform a pre-check operation to determine whether the program counter check condition is present. Hence, in this embodiment, the presence of the instruction flow changing instruction will not automatically trigger the performance of a program counter check operation, in situations where the divergent flag is currently unset. Instead, in some instances the thread processing circuitry may be able to determine that in fact a program counter check operation is not required. Merely by way of example, if the thread processing circuitry can identify that, for all of the active threads, the branches were either all taken or all not taken, it may be possible to deduce that there is in fact no divergence, and accordingly there is no need to perform the program counter check operation.

In one embodiment, it is arranged that the register storage contents are only updated when the currently executed instruction is an instruction flow changing instruction. This provides a particularly efficient implementation, since as mentioned earlier such instruction flow changing instructions do not themselves typically specify a destination, and hence their write slot (that would otherwise be unused) can be used to update the program counter information in the relevant hidden register of the register storage.

There are a number of ways in which the program counter check operation can be performed when the convergence indicator is set, but in one embodiment, in such a situation, the program counter checking circuitry is arranged to read from the register storage the program counter information for each pending thread of the first thread group, and to compare that program counter information with the common program counter as updated for the first program thread following the exit event. In particular, the common program counter as updated will indicate the program counter value for all of the currently active threads.

The pending threads are those valid threads of the first thread group that are not currently considered to be active threads. In particular, following a divergence event, it will typically be the case that a subset of the threads will be marked as pending threads and a subset marked as active threads, and that the processing will then continue only in respect of the active threads until re-convergence occurs. By taking the above approach where the updated common program counter is used to provide the up-to-date program counter value for the active threads, there is no need to write to the register storage prior to performing the program counter check operation. Hence, this avoids the need to update the register storage, which might otherwise incur a performance penalty.

There are a number of ways in which the program counter checking circuitry can be triggered to perform the program counter check operation when the program counter check condition is determined to be present. In one embodiment, the thread processing circuitry may itself issue a signal to the program counter checking circuitry to trigger performance of the program counter check operation. However, in an alternative embodiment, the thread processing circuitry may merely indicate, in association with the exit event, that a program counter check operation is required, and the scheduling circuitry may then be arranged to send an appropriate signal to the program counter checking circuitry to trigger the performance of that program counter check operation.

In one particular embodiment, when the program counter check condition is determined to be present by the thread processing circuitry, the thread processing circuitry is arranged to adjust in a first direction a dependency value for the first thread group, and to issue a control signal to the program counter checking circuitry to trigger performance of the program counter check operation. The program counter checking circuitry is then arranged on completing the program counter check operation to adjust, in a second direction opposite to said first direction, the dependency value for the first thread group, and the scheduling circuitry is prevented from selecting the first thread group for execution by the thread processing circuitry unless the dependency value for the first thread group has a value indicating that there are no pending program counter check operations for the first thread group. Hence, by maintaining the dependency value in the way described, the scheduling circuitry may merely refer to the current value of the dependency value for each thread group when determining which thread groups are available to be issued to the thread processing circuitry. Whilst any program counter check operation is pending for a particular thread group, the scheduling circuitry will hence be prevented from selecting that thread group for execution by the thread processing circuitry.

As mentioned earlier, in one embodiment the register storage contents are updated by the thread processing circuitry on executing an instruction flow changing instruction, this providing a particularly efficient implementation in situations where the write slot associated with the instruction flow changing instruction is otherwise unused. However, if in an alternative embodiment such an update of the register storage would in fact require one or more extra cycles within the thread processing circuitry, then instead of incurring that potential extra time, the thread processing circuitry may be arranged on executing the instruction flow changing instruction to write into a temporary storage (for example a scratchpad memory) a branch taken address, a branch not taken address and an indication, for each active thread, of whether a branch was taken in response to executing the instruction flow changing instruction.

Then, the program counter checking circuitry may be arranged so that it is responsive to execution of the program counter check operation to access the temporary storage and reconstruct, for each active thread, a program counter value computed by executing said instruction flow changing instruction. The program counter checking circuitry may then be arranged, when performance of the program counter check operation indicates that the threads of the first thread group have diverged, to write the program counter value for each active thread into the register storage. Hence, in this instance it is the program counter checking circuitry that will perform the write operation to the register storage. When subsequently testing for re-convergence, the process can proceed in the same way as discussed earlier and there is still no need to perform any writes to the register storage when testing for re-convergence.

Particular embodiments will now be described with reference to the Figures.

FIG. 1 is a block diagram of an apparatus in accordance with one embodiment. The scheduling circuitry 10 is responsible for determining which thread group to select for execution on the thread processing circuitry 30 at any particular point in time. In particular, when the thread processing circuitry exits execution of a current thread group, that exit will be signalled over path 60 to the scheduling circuitry 10, and the scheduling circuitry can then determine a next thread group to select for execution on the thread processing circuitry 30. The scheduling circuitry maintains a common next program counter value for each thread group within the storage 15, as indicated by the storage elements 20, 22 in FIG. 1. In particular, the apparatus is arranged to operate in a SIMT manner so that when a thread group is to be executed on the thread processing circuitry, the thread processing circuitry executes the same instructions for each of the active threads, with the instructions being identified using the common next PC value for the particular thread group.

In particular, once the scheduling circuitry has selected the thread group, then the common next PC value for that thread group can be provided to the instruction cache 25 to cause instructions to be issued to the thread processing circuitry 30. Typically, the first instruction will be identified by the common next PC value, and a number of additional instructions will also be issued (as identified by incrementing that PC value), in order to provide a block of instructions to the thread processing circuitry for execution. That block of instructions is sometimes referred to as a clause, and the number of instructions in the clause may be statically defined, or in some instances may be determined dynamically. The thread processing circuitry 30 will then execute, for each active thread, the instructions of the clause, whereafter an exit event will be deemed to exist, causing the thread processing circuitry to finish executing instructions for that thread group (until that thread group is subsequently reselected by the scheduling circuitry 10).

As will be appreciated by those skilled in the art, if the instructions required are already present within the instruction cache 25, they can be issued immediately to the thread processing circuitry 30, but in the event of a cache miss for any of the required instructions, an instruction fetch request can be issued to the memory system to retrieve the required instructions, so they can then be issued to the thread processing circuitry (in one embodiment those fetched instruction will also be allocated into the instruction cache 25 as they are fetched from memory).

As mentioned earlier, when executing threads of a thread group in a SIMT manner, it is possible that the threads' program counter values can diverge with respect to each other upon execution of an instruction flow changing instruction. The instruction flow changing instruction will typically be a branch instruction, and it will be understood that when such instructions are executed, the resultant updated program counter value will depend on whether the branch has been taken or not taken. In some incidences, it can also depend on the contents of particular registers, and those contents can differ for differing threads. In particular, whilst the threads execute the same instructions, they typically operate on different data, and hence it is possible that, for indirect branches which specify the target address with reference to the contents of a register, the actual target address may be different for particular threads, even if all of those threads do take the branch.

Due to the potential for divergence when executing a branch instruction, if a clause does contain a branch instruction, that branch instruction in one embodiment will be the final instruction in the clause. Hence, when the branch instruction is executed, the exit event will be determined to be present. At this point, check condition detector circuitry 40 within the thread processing circuitry 30 can determine whether there is a need for the program counter values to be checked to assess whether there is divergence or not. If the exit event arises due to the execution of a branch instruction, then in one embodiment it may be decided that a program counter check operation is always required, but in another embodiment, as will be discussed in more detail later, pre-check circuitry 45 may be provided as part of the check condition detector 40 to determine certain situations where it can be guaranteed that there will not in fact be any divergence, and accordingly a program counter check operation is not required.

In order to check for re-convergence of program counter values, the code can incorporate convergence indicators in association with particular instructions. These can be added statically by the compiler at the time the code is compiled, or alternatively as discussed earlier, at least some convergence indicators may be added dynamically during code execution. If, on occurrence of the exit event, it is determined that a convergence indicator is present in association with the currently executed instruction, then again the check condition detector 40 can determine whether a program counter check operation should be performed.

The operation of the check condition detector 40 in one embodiment will be discussed in more detail later with reference to FIG. 3, but in summary, whenever the check condition detector 40 detects, on occurrence of the exit event, that a program counter check condition is present, it can trigger the program counter checking circuitry 50 to perform a program counter check operation. In one embodiment, this check operation involves performing a sorting algorithm in respect of the program counter values for the threads, as will be discussed in more detail later with reference to FIG. 4.

As shown in FIG. 1, a register file 35 is provided within the thread processing circuitry 30. This includes a set of architectural registers 37 that can be specified by instructions as source registers or destination registers when performing the operations required by those instructions. The registers are referred to as architectural registers because they are visible to the programmer model when writing the instructions of the thread.

As shown in FIG. 1, in the described embodiments the register file 35 is extended so as to also include some additional registers 39. These can be considered not to be architectural registers, since they are not directly specifiable by the instructions. However, as will be described in more detail later, these additional registers can be populated with the program counter values for each thread of a thread group so as to allow that information to be available to the program counter checking circuitry 50 when performing the program counter check operation. This provides a particularly efficient storage for such information, requiring significantly less area than if a separate RAM structure or the like were to be provided for the storage of that program counter information for access by the program counter checking circuitry 50.

It also facilitates a mechanism whereby the program counter checking circuitry functionality can be placed off of the critical path, so as to allow the thread processing circuitry to be issued with instructions of another thread group by the scheduling circuitry whilst the result of the program counter check operation is awaited. For example, in one embodiment, on execution of a branch instruction, the thread processing circuitry 30 is arranged to perform a write operation to the relevant register(s) within the additional registers 39 in order to update the program counter information for the threads of the thread group. It can then determine, via the check condition detector 40, whether a program counter check operation is needed or not, can notify the program counter checking circuitry accordingly, and at that point can issue an exit back to the scheduling circuitry 10, so that the scheduling circuitry can employ the thread processing circuitry resources for another thread group.

For the thread group that has just been exited by the thread processing circuitry 30 (for simplicity let us call that thread group thread group X), it is important that the scheduling circuitry 10 does not reselect thread group X for execution on the thread processing circuitry 30 if there is a pending program counter check operation for that thread group X. In one embodiment, this functionality is controlled using the dependency counters 55. A separate dependency counter can be provided for each thread group, and those counters can be incremented by the thread processing circuitry 30 and decremented by the program counter checking circuitry 50. In particular, when for thread group X, the check condition detector 40 determines that a program counter check operation is required, then in addition to notifying the program counter checking circuitry 50, it will issue a signal to the dependency counters 55 to cause the dependency counter for thread group X to be incremented. Subsequently, when the program counter checking circuitry completes the program counter check operation for thread group X, it issues a signal to the dependency counters 55 to cause the dependency counter for thread group X to be decremented.

In one particular embodiment, each of the dependency counters is initialized to a logic 0 value, and the scheduling circuitry 10 is arranged to only select for execution a thread group from amongst those thread groups whose associated dependency counter is 0. Any thread groups having non-zero dependency counters are excluded from the selection process by the scheduling circuitry 10.

When the program counter checking circuitry is triggered to perform a program counter check operation for thread group X, it applies a deterministic sorting rule to determine a program counter value from amongst the program counter values of the active and pending threads, and an indication of the threads whose program counter is at that chosen program counter value. In one particular embodiment, the deterministic sorting rule is used to determine a minimum program counter value amongst the program counter values of the active and pending threads.

Within a particular thread group, it may be that all of the threads are considered valid, but in other embodiments one or more of the threads may be marked as invalid, any such invalid threads being excluded from processing. Considering the valid threads, then prior to any divergence all of those valid threads are considered to be active threads, and accordingly when the thread group is executing on the thread processing circuitry, the thread processing circuitry will execute instructions for each of those threads. However, following a divergence being detected, then until re-convergence occurs only a subset of those valid threads will be considered active, and the remaining valid threads will be considered as pending threads. As will be discussed in more detail later, active masks and pending masks can be created to identify the active threads and pending threads for each thread group, and the program counter checking circuitry can evaluate the program counter values for the active and pending threads when performing the program counter check operation. For this purpose, the program counter checking circuitry 50 can be given read access to the additional registers 39 within the register file 35, which as discussed earlier will be updated on execution of each branch instruction to capture the updated program counter values for the various threads of each thread group. The program counter checking circuitry 50 can also have access to the storage 15 within the scheduling circuitry 10 to obtain program counter values for certain threads when performing divergence checking through execution of the program counter check operation, as will be discussed in more detail later with more reference to FIG. 4.

Through performance of the program counter check operation, a common next program counter (PC) for thread group X will be determined, which will be routed over path 70 to the scheduling circuitry 10 for storage in the appropriate element 20, 22 of the storage 15. In addition, the program counter checking circuitry will also determine some other control signals which will be discussed in more detail later, namely an updated active mask, an updated pending mask, and a divergent flag, which can be output over path 75.

Figure 2:
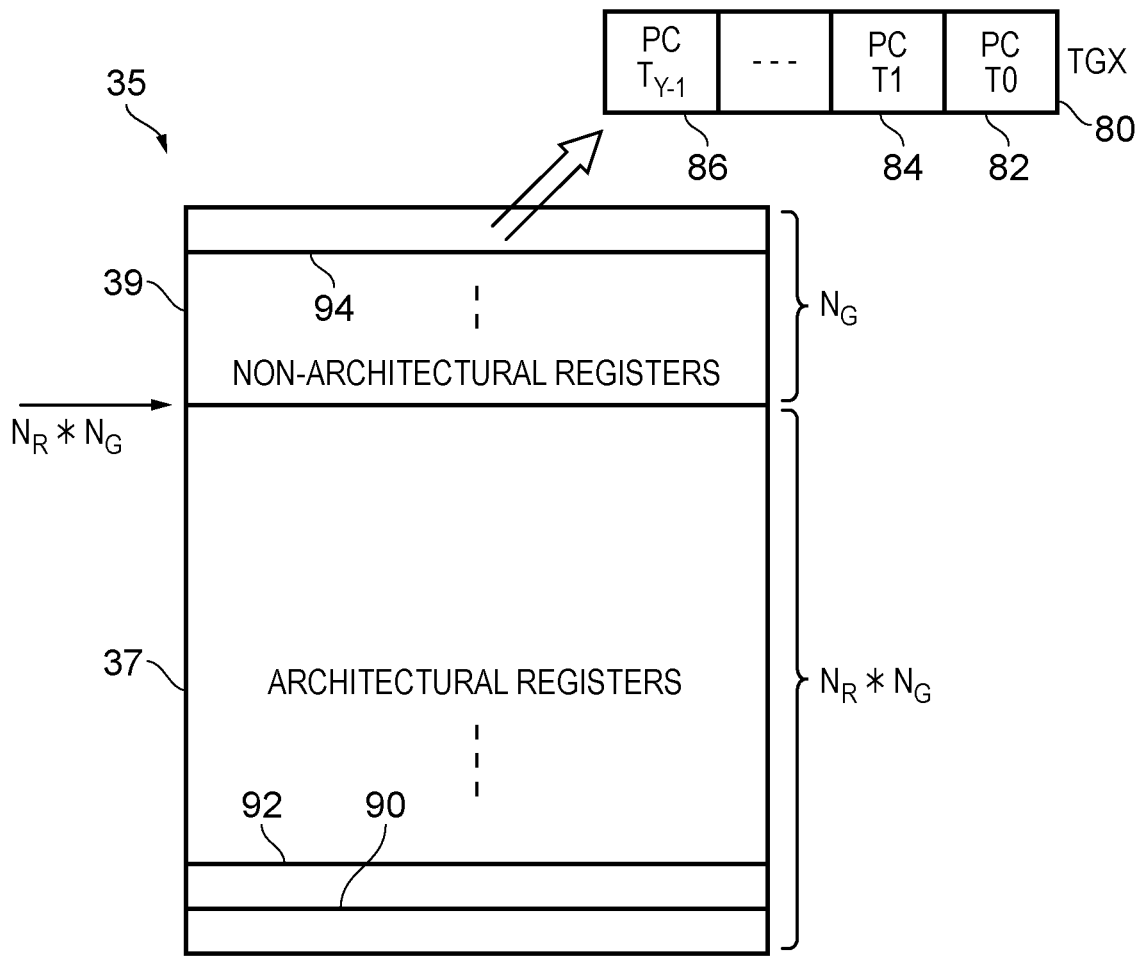
FIG. 2 illustrates how the register file may be organized in accordance with one embodiment.

FIG. 2 illustrates in more detail the register file 35 of FIG. 1 in accordance with one embodiment. As discussed earlier, the register file 35 includes a set of architectural registers 37. Each architectural register 90, 92 can be formed of a number of physical scalar registers, so as to enable data values to be maintained separately for each of the threads of a thread group. If the number of thread groups that can share access to the register file 35 is $N_G$, and the number of architectural registers per thread is $N_R$, then $N_R*N_G$ architectural registers 90, 92 may be provided within the portion 37. When a particular thread accesses one of those architectural registers, it will access the particular portion (scalar register) that stores the data value for that thread.

The additional registers 39 can be considered to be non-architectural registers, as they cannot be directly accessed by specification of source or destination operands within instructions. In one embodiment, $N_G$ additional registers will be provided, namely one for each thread group that can access the register file. As with the architectural registers, each register 94 shown in FIG. 2 can be made up of multiple scalar registers, and the register 94 associated with a particular thread group can be used to store the PC value for each thread of that thread group. This is illustrated schematically in FIG. 2 for the register 80 associated with thread group X. This includes a number of fields 82, 84, 86, one for each of the Y threads provided within thread group X.

Figure 3:
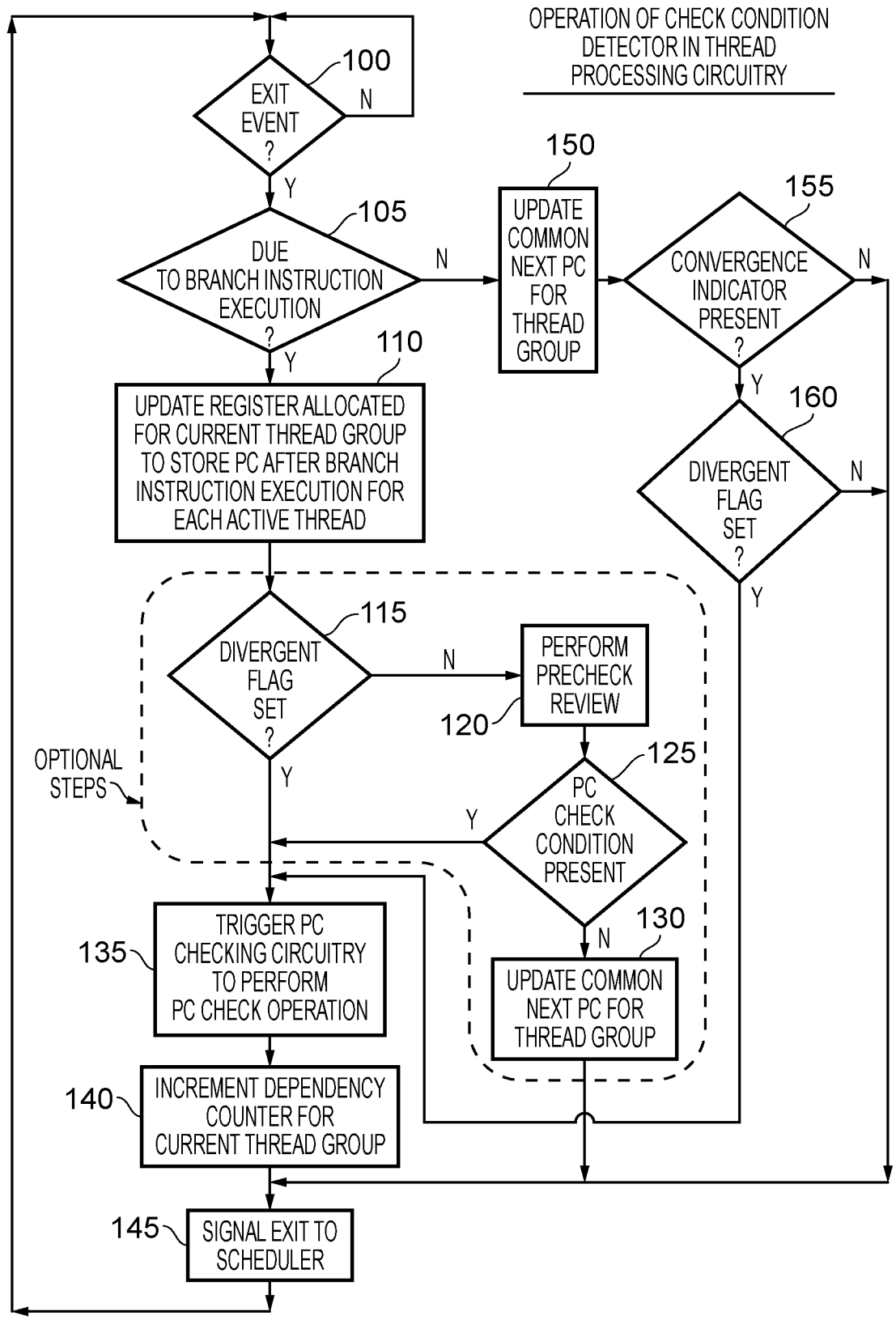
FIG. 3 is a flow diagram illustrating the steps performed by the check condition detector of FIG. 1 in accordance with one embodiment.

FIG. 3 is a flow diagram illustrating the operation of the check condition detector 40 in accordance with one embodiment. At step 100 it is determined whether an exit event has occurred, and when it has it is determined at step 105 whether that exit event is due to execution of a branch instruction. If so, then in one embodiment the thread processing circuitry is arranged at step 110 to update the register 94 within the non-architectural registers 39 that is allocated for the current thread group. This may involve writing to multiple scalar registers that collectively form the allocated register 94. Only the PC information for the active threads will be updated, in particular those entries being updated with the calculated PC that has resulted from execution of the branch instruction for that associated thread. Any PC information held for the other threads is maintained as is, and not overwritten.

Following step 110, then, in one embodiment, it is detected at step 115 whether the divergent flag is set. As discussed earlier, the divergent flag is set by the program counter checking circuitry when a divergence in the program counter values is identified, and a separate divergent flag is maintain for each thread group. Hence, if the divergent flag is set, this will mean that a previous program counter check operation has identified divergence in the PC values for the current thread group being considered. In this instance, the process will proceed to step 135, where the check condition detector 40 will trigger the PC checking circuitry 50 to perform the PC check operation. In addition, at step 140, the dependency counter for the current thread group will be incremented, and at step 145 the exit will be signalled to the scheduler 10.

In one embodiment, if the divergent flag is determined not to be set at step 115, then a pre-check review can be performed at step 120 by the pre-check circuitry 45 of the check condition detector 40. In particular, when there is currently no divergence, the pre-check circuitry may be able to determine from information about execution of the branch instruction, whether there is any possibility of divergence. As a particular example, if all of the valid threads are also currently active, and it is known that, for each thread, the branch was not taken, then it will be known that there is no possibility of divergence. Similarly, if it is known that all of the threads instead took the branch, and it is known that the branch target address will be the same for each thread, such as for example would be the case if the branch target address is specified with reference to an immediate value identified in the instruction, then again it can be determined that there is no possibility of divergence. Accordingly, under such circumstances, the pre-check circuitry 45 may determine that the PC check condition is not present. This is assessed at step 125, and if the pre-check circuitry has been able to determine that the PC check condition is not present, then the process merely proceeds to step 130 where the common next PC is updated for the thread group, by issuing a signal over path 60 to the scheduling circuitry to update the relevant storage element 20, 22. In particular, at this point, it is known that all of threads share a common PC and there is no divergence. However, if the pre-check review is not able to determine definitively that there is no divergence, then the process proceeds to step 135 to cause the PC checking circuitry to be triggered to perform the PC check operation.

As indicated in FIG. 3, the steps 115, 120, 125, 130 are optional, and in an alternative embodiment could be excluded. In that embodiment, whenever the exit event is due to a branch instruction execution, the PC checking circuitry will be triggered to perform the PC check operation at step 135.

If at step 105 it is determined that the exit event was not due to branch instruction execution, then it is known that all of the active threads share a common PC, and accordingly the common next PC can be updated for the thread group at step 150. At step 155 it is determined whether the convergence indicator is present. If it is not, then the process merely proceeds to step 145 where the exit is signalled to the scheduler. However, if the convergence indicator is present, it is determined at step 160 whether the divergent flag is set. If the divergent flag is not set, then this means that there is no divergence currently for the thread group in question, and accordingly there is no need to perform any PC check operation, and again the processing can proceed directly to step 145 to signal the exit to the scheduler.

However, if it is determined at step 160 that the divergent flag is set, then the process proceeds to step 135, to cause the PC checking circuitry to be triggered to perform the PC check operation.

In the embodiment described above, it is assumed that the thread processing circuitry 30 directly signals to the program counter checking circuitry 50 when a program counter check operation is required, and the dependency counters are used to enable the scheduling circuitry to decide whether certain thread groups are candidates for being executed on the thread processing circuitry. In an alternative embodiment, the dependency counters 55 are not used, and it is the scheduling circuitry 10 itself which notifies the program counter checking circuitry when a program counter check operation is required. In that embodiment, the check condition detector 40 still performs the various steps shown in FIG. 3, but steps 135 and 140 are omitted and step 145 is supplemented so that when the exit is signalled to the scheduler, the scheduler is also notified that a PC check operation is required if step 145 has been reached by any of the paths in FIG. 3 which would have previously routed through step 135.

The scheduling circuitry 10 is then responsible for instructing the program counter checking circuitry 50 to perform the program counter check operation for the relevant thread group, and will then not allow that thread group to be selected for execution on the thread processing circuitry 30 until the program counter checking circuitry in due course confirms that the required program counter check operation has been completed.

Figure 4:
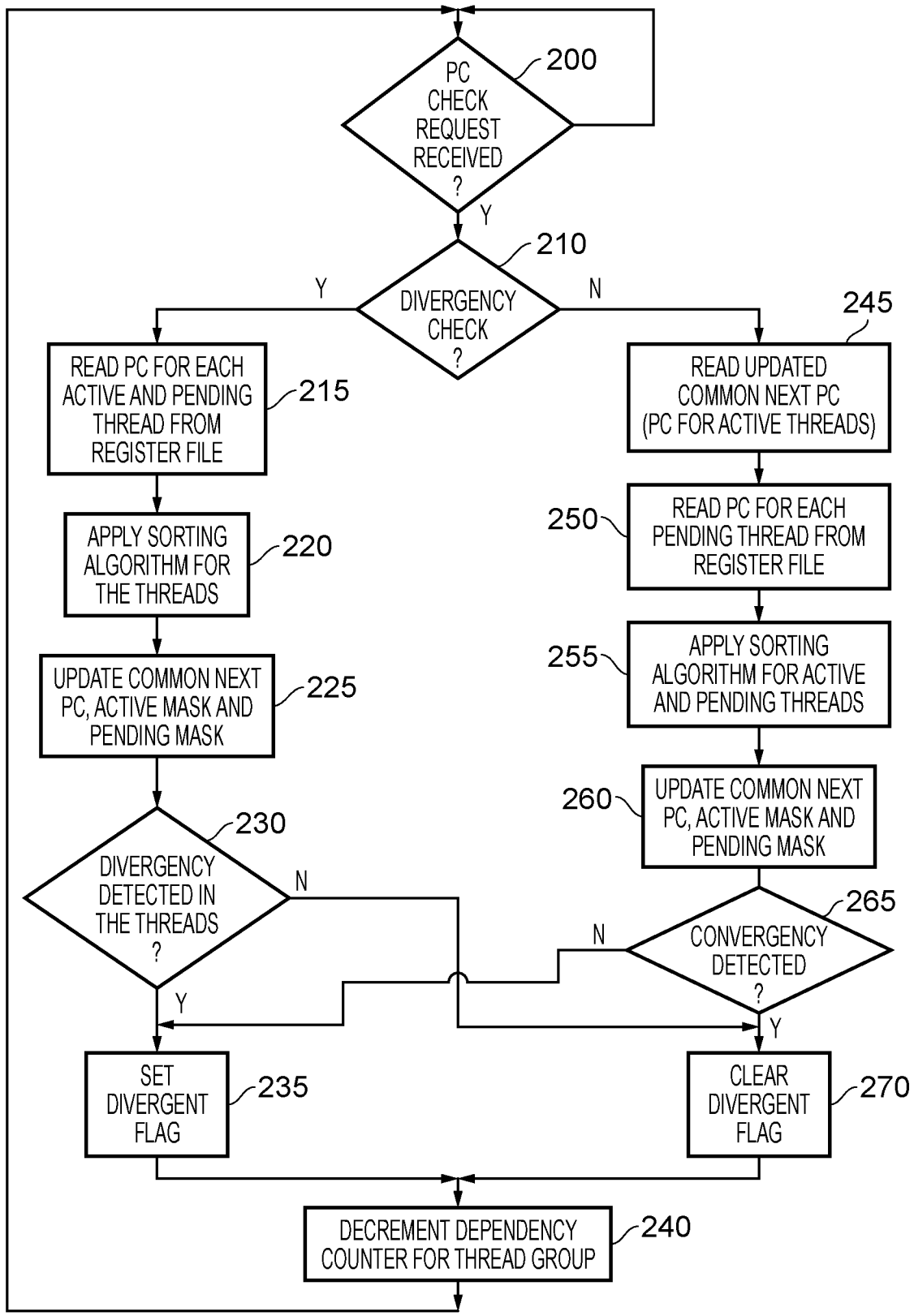
FIG. 4 is a flow diagram illustrating the steps performed by the program counter checking circuitry of FIG. 1 in accordance with one embodiment.

FIG. 4 is a flow diagram illustrating the operations performed by the program counter checking circuitry 50 in accordance with one embodiment. At step 200, it is determined whether a PC check request has been received. Any such PC check request will identify the thread group to which that check request relates. When a PC check request has been received, then at step 210 it is determined whether that request is made due to a potential divergence or a potential re-convergence. This information can be included in the request sent by the request condition detector 40 (or the scheduling circuitry).

If a divergence check is required, then the process proceeds to step 215 where the program counter value for each active and pending thread is read from the register file 35, and in particular from the relevant register within the additional registers 39.

Thereafter, at step 220, a sorting algorithm is applied for the threads, in one embodiment the sorting algorithm determining the minimum program counter value from amongst those read at step 215 and an indication of which threads have that minimum program counter value.

At step 225, this information is used to update the active mask and the pending mask, and also to update the common next PC value which is then issued over path 70 to the scheduler 10. In one embodiment, the common next PC is set to the minimum PC value determined through application of the sorting algorithm at step 220.

At step 230, it is determined whether divergence is detected in the threads. This will be the case is the pending mask is not all zeros. If divergence is detected then the process proceeds to step 235 where the divergent flag is set, whereas otherwise the process proceeds to step 270 where the divergent flag is cleared. Following step 235 or 270, the process proceeds to step 240 where the dependency counter for the relevant thread group is decremented, whereafter the process returns to step 200.

If at step 210 it is determined that the required check is a convergence check, then the process proceeds to step 245. In particular, in the situation of a convergence check, there will not have been a branch instruction executed as the final instruction of the clause, and accordingly no write operation will have been performed to the relevant additional register 39. However, it is known that all of the active threads share the same PC, and that information will have been used to update the common next PC. Accordingly, at step 245 the program counter checking circuitry 50 retrieves the updated common next PC from the storage 15 of the scheduling circuitry 10, and then reads the PC for each pending thread from the register file at step 250. Thereafter, it applies the sorting algorithm at step 255 and then updates the common next PC, active mask and pending mask at step 260. These steps 255, 260 are equivalent to steps 220, 225 discussed earlier.

Thereafter, it is determined whether convergence is detected, which in one embodiment will be the case if the pending mask is now all zeros. If so, then the divergent flag is cleared at step 270 whereas otherwise it is set at step 235. Again, the dependency counter is then decremented at step 240.

If the alternative embodiment discussed earlier is implemented where the dependency counters are not used, and instead the scheduling circuitry takes on the responsibility for requesting the program counter checking circuitry to perform program counter check operations as required, then step 240 in that instance is replaced by a step where the program counter checking circuitry notifies the scheduling circuitry that the program counter check operation for the relevant thread group is complete.

FIG. 5 captures in tabular form the decisions taken by the check condition detector 40 in one embodiment, in particular to identify whether a program counter check operation is required or not. As shown in the table, this decision is based on both the exit event type and an indication as to whether the divergent flag is currently set or unset. When the exit event type is the normal type, i.e. there is no convergence indicator associated with the final instruction of the clause, and the final instruction of the clause is not a branch instruction, then a program counter check operation is not required irrespective of the current state of the divergent flag. However, as indicated by the table 300 if the final instruction in the clause has the convergence indicator associated with it, then it is ascertained whether the divergent flag is set or not. If the divergent flag is not set, then no program counter check operation is required, but if the divergent flag is set, then a program counter check operation is required.

As also shown in the table 300, if the final instruction in the clause is a branch instruction, then if the divergent flag is already set, a program counter check operation will be required. However, if the divergent flag is unset, then there are two options. In particular, if the optional steps 115, 120, 125, 130 of FIG. 3 are omitted, then, as shown by option 1, the check condition detector will determine that a program counter check operation is required. However, if the optional steps 115, 120, 125, 130 are implemented, then, when the divergent flag is unset, the decision as to whether a program counter check operation is required or not will depend on the outcome of the pre-check review performed by the pre-check circuitry 45.

FIG. 6 illustrates an example sequence for thread group X. In particular, a table 350 is shown where each entry identifies an active mask, pending mask, divergent flag status, common next PC value, and active lane PCs information. Time is assumed to progress as we pass through each of the entries from the upper entry towards the bottom entry. Accordingly, at a first point in time, the scheduler selects thread group X for execution by the thread processing circuitry, and accordingly an issue process is performed to issue the required instructions of the clause to the thread processing circuitry 30. In this example, it is assumed that the thread group consists of four threads, all of which are active. Accordingly, the active mask is all 1s and the pending masks is all 0s. Further, the divergent flag is assumed to be unset at this point in time and the common next PC used to determine the instructions issued to the SIMT thread processing circuitry is assumed to have the value of 48.

At a subsequent point in time, it is assumed the exit event takes places due to the final instruction in the clause being a branch instruction. At this point, the entries for the active mask, pending mask, divergent flag and common next PC are unchanged, but it is assumed that the PCs computed by execution of the branch instruction for each of the threads are as shown in the final column (the active lane PCs column). As can be seen, in this instance two of the threads have progressed to a PC value of 128 but the other two threads have progressed to a PC value of 96. At this point, the check condition detector 40 will trigger the program counter checking circuitry 50 to perform a PC check operation, during which the PC values will be sorted. This will cause the sorting algorithm to determine that the minimum PC is 96 and that there is in fact divergence. Accordingly, it will set the active mask to 0011, the pending mask to 1100, and will set the divergent flag. It will also issue as the common next PC value 96.

At this point, the scheduler is free to select thread group X again for allocation to the thread processing circuitry. When it does so, as indicated by the fourth entry of the table 350, only two of the threads will be active, namely the two threads that had proceeded to program counter value 96.

It is assumed that subsequently when the exit event arises, a convergence indicator is associated with the final instruction. As will be apparent from the earlier discussion of step 155, 160 in FIG. 3, this will again trigger performance of the PC check operation, and additionally the common next PC will be updated to 128, to match the common PC that has been computed for the two active threads. When the PC check operation is performed, it will be identified that the minimum PC value is 128, and that re-convergence has in fact occurred, since both the active threads and the pending threads all share the same PC value. Accordingly, the program counter checking circuitry 50 will reset the active mask to all 1s, the pending mask to all 0s, and will clear the divergent flag.

The scheduling circuitry 10 is then again free to select thread group X for issuance to the thread processing circuitry, and is assumed to do so at a subsequent point in time, as indicated by the seventh entry in the table 350.

When the current clause then later exits, it is assumed in this instance that it is again due to execution of a branch instruction as the final instruction in the clause. In this event, the next PC value will be left at 128, and it is assumed the active lane PCs take the values shown in table 350. In particular, it is assumed that threads 0 and 2 have proceeded to a PC value of 196, whilst threads 1 and 3 have proceeded to a PC value of 256. Again, the PC check operation will be triggered and performance of the PC check operation will result in allocating the next common PC to have a value of 196, setting of the divergent flag, setting of the active mask to 0101, and setting of the pending mask to 1010. Processing can then continue as discussed earlier.

As noted by the asterisk against each PC check operation entry in the table 350, whilst the PC check operation is being performed for thread group X the scheduler can select another thread group for execution on the thread processing circuitry 30, and as such the time taken by the program counter checking circuitry 50 to perform the program counter check operation does not impact the overall performance of the apparatus, assuming useful work can be performed in relation to other thread groups during that time.

Figure 7A:
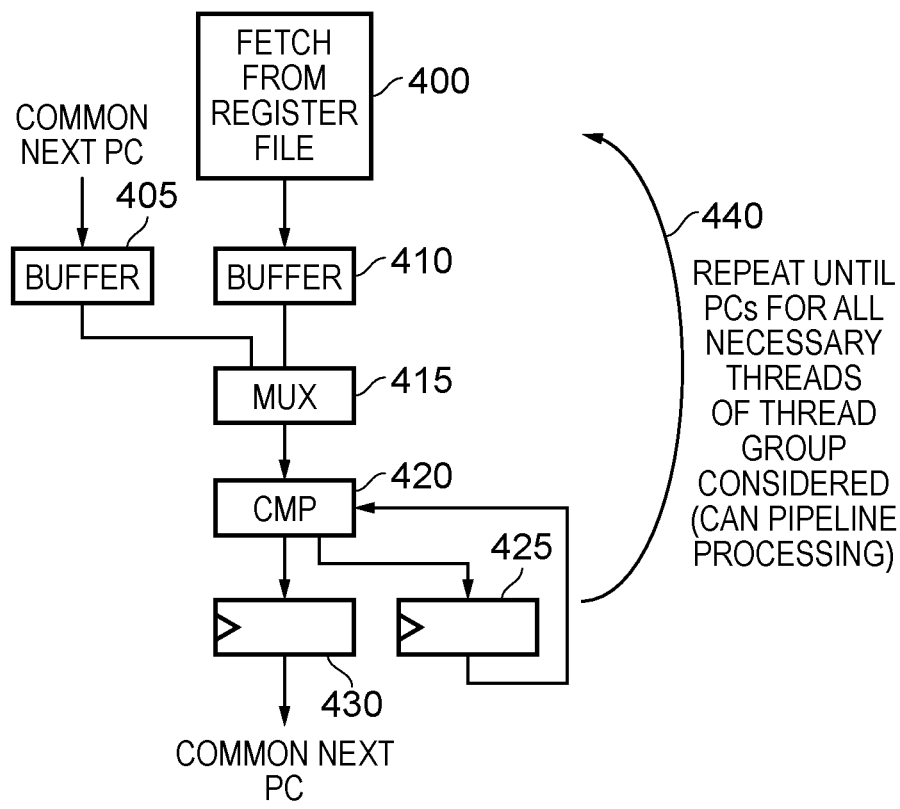
FIGS. 7A and 7B illustrate how the program counter checking circuitry of FIG. 1 may be constructed in accordance with two different embodiments.

Since the program counter checking circuitry 50 is off of the critical path, the manner in which the PC checking circuitry is constructed can be chosen as desired, to trade off throughput with area. This is illustrated schematically by FIGS. 7A and 7B. In particular, FIG. 7A shows a serial approach where the PC values for the valid threads are not all considered at the same time. In particular, in one embodiment, each thread may be considered one at a time or the threads can be considered in smaller groups such as quads. In particular, if for example a thread group contained 32 threads, the PC values may be considered for one quad (i.e. for four threads) at a time. As indicated by step 400, the PC information can be fetched from the register file over one or more cycles, and then buffered at step 410. The common next PC can also be buffered at step 405 if required (as discussed earlier with reference to FIG. 4, the common next PC information may be used if the PC check operation is being performed due to potential convergence). A multiplexing (MUX) stage 415 can then be used to select the appropriate PC value or PC values to input to the comparator 420. The comparator 420 is arranged to determine the minimum PC value from amongst those provided by the MUX stage 415 and the current contents of the storage element 425 (except for a first iteration where the content of the storage element 425 is effectively ignored, and accordingly after the first iteration the storage element 425 is populated with what is initially considered to be the minimum PC value after the first comparison).

As indicated by the arrow 440, the process can then be repeated until the PC value for every valid thread has been considered, and accordingly the actual minimum PC value has been determined. That final minimum PC value can be captured in the storage element 430 and then output as the common next PC. In one embodiment, all of the PC information required from the register file can be read initially, so that step 400 does not need repeating, and the process merely repeats the remaining stages until sorting of all the PC values has been performed.

Figure 7B:
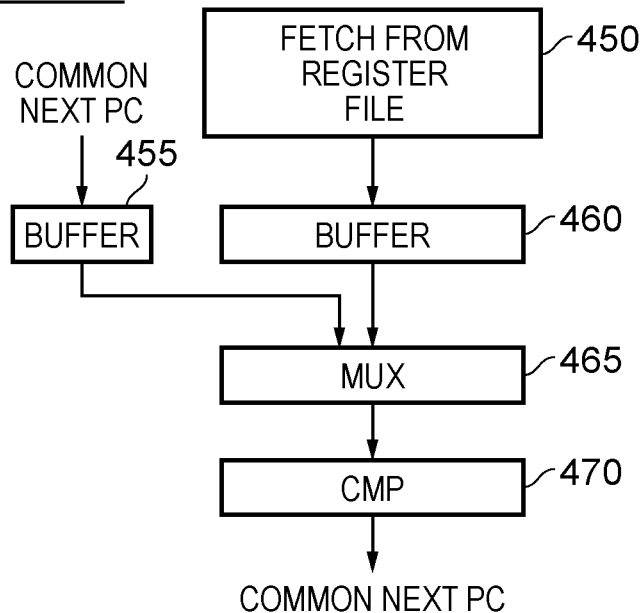

FIG. 7B illustrates a fully parallel approach. Again the information is fetched from the register file at step 450 and buffered at step 460, and again the common next PC can also be buffered at step 455. MUX circuitry 465 is then used to select for each valid thread the relevant PC value, so that the PC values for all of the valid threads can be compared in a single stage at step 470 in order to produce the common next PC value.

Whilst not shown for simplicity in FIGS. 7A and 7B, it will be appreciated that additional components will also be provided to construct the active and pending masks, and to set the divergent flag. When using the FIG. 7A approach, the active and pending masks can be created using an iterative process so that by time the final iteration has been performed, the active and pending masks are fully populated. The divergent flag is then set or unset at the end of the process once it is determined whether the pending mask is all 0s or not (all 0s in the pending mask indicating that the divergent flag should be clear, whilst the presence of any logic 1 value in the pending mask indicates that the divergent flag should be set).

In accordance with the above described embodiments, the additional registers 39 are only written to by the thread processing circuitry following execution of a branch instruction. Since a branch instruction will not typically specify a destination register within the register file 35, the available write slot (that would otherwise go unused) can be used to perform the required write to the relevant additional register 39 allocated to the current thread group. Hence, the need to write to the additional registers does not give rise to any performance impact.

However, if in an alternative embodiment one or more extra cycles were required to perform the write to the additional registers, then an alternative approach could be employed, as shown schematically in FIG. 8. In particular, step 500 replaces step 110 of FIG. 3. Hence, rather than writing to the registers, if the exit event was due to a branch instruction execution, the thread processing circuitry writes to a temporary storage, such as scratchpad memory, certain information. In particular, in one embodiment, it stores the target address if the branch was taken, the target address if the branch was not taken, and an indication for each active thread as to whether the branch was taken or not taken. The remainder of FIG. 3 then remains unchanged.

If the processing steps of FIG. 3 give rise to a PC check being triggered, then in situations where step 500 had been performed, this will be due to the fact that a potential divergence has occurred, and accordingly the yes path from step 210 of FIG. 4 will have been followed. In place of step 215 of FIG. 4, step 510 of FIG. 8 is performed, where the program counter checking circuitry constructs the PC value for each active thread from the scratch pad contents. For the pending threads, it can still read the PC values from the register file. As indicated by step 520, the process can then proceed from step 220 of FIG. 4, but with the additional step that, if divergence is detected at step 230, then in addition to setting the divergent flag, the program counter checking circuitry will perform a write operation to the relevant additional register 39 within the register file 35 in order to update the PC value information for each active thread. To implement such an alternative embodiment, it would be necessary to provide a write port for the program counter checking circuitry to be able to write into the additional registers 39. As a further alternative, if desired the program counter checking circuitry can be arranged to perform a write operation to the relevant additional register 39 within the register file 35 in order to update the PC value information for each active thread, irrespective of whether divergence is detected at step 230.

It will be appreciated that the above described embodiments provide a particularly area efficient mechanism for performing the required PC sorting process to detect divergence and re-convergence of threads of a thread group in a SIMT processor. The extension of the register file to accommodate the necessary program counter information provides a particularly area efficient mechanism, and also in one embodiment can be updated without incurring any performance penalty. Further, such an approach allows the program counter checking circuitry to be placed off the critical path, providing a great deal of flexibility as to how the program counter checking circuitry is constructed, allowing a trade off to be made between throughput of the program counter checking circuitry and its area requirements. Since the program counter checking operation is performed off of the critical path, the scheduling circuitry is free to allocate other thread groups to the thread processing circuitry whilst the program counter check operation is being performed.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
    scheduling circuitry to select for execution a first thread group from a plurality of thread groups;
    thread processing circuitry, responsive to the scheduling circuitry, to execute active threads of the first thread group in dependence on a common program counter shared between the active threads;
    the thread processing circuitry being responsive to an exit event occurring for the first thread group, to determine whether a program counter check condition is present;
    the thread processing circuitry having register storage to store program counter information for each thread of the first thread group; and
    program counter checking circuitry having access to said register storage and, in the presence of said program counter check condition, to perform a program counter check operation to update the common program counter and an active thread indication for the first thread group;
    the scheduling circuitry being arranged to select, for execution by the thread processing circuitry, a second thread group from said plurality of thread groups other than said first thread group, whilst awaiting performance of the program counter check operation by the program counter checking circuitry for the first thread group;
    wherein said register storage comprises at least one register for each thread group in said plurality of thread groups, to allow program counter information for each thread to be maintained for each of the plurality of thread groups.

2. The apparatus as claimed in claim 1, further comprising:
    a register file comprising a plurality of registers specifiable by instructions executed for each thread; and
    the register storage comprises a number of additional registers unspecifiable by said instructions.

3. The apparatus as claimed in claim 1, wherein said exit event is determined to be present at least in response to execution of an instruction flow changing instruction by the active threads of the first thread group.

4. The apparatus as claimed in claim 3, wherein the thread processing circuitry is responsive to the execution of said instruction flow changing instruction to write into the register storage, for each active thread, a program counter value computed by executing said instruction flow changing instruction.

5. The apparatus as claimed in claim 4, wherein the program counter checking circuitry has read access to said register storage during performance of the program counter check operation.

6. The apparatus as claimed in claim 1, wherein:
    the program counter checking circuitry is arranged to perform the program counter check operation by evaluating the program counter associated with each thread using a deterministic sorting rule, to determine a next program counter value and an indication of the threads whose program counter is at that next program counter value;
    the program counter checking circuitry is constructed to adopt one of the following implementations dependent on a desired throughput:
    (i) to evaluate the program counter of all threads of the thread group in parallel;
    (ii) to perform an iterative sequence of evaluation steps, where a different subset of the program counters are evaluated in each iteration of the iterative sequence, and a result of the final iteration indicates the next program counter value and the threads whose program counter is at that next program counter value.

7. The apparatus as claimed in claim 1, wherein the program counter checking circuitry is arranged to perform the program counter check operation by evaluating the program counter associated with each thread using a deterministic sorting rule, to determine a minimum program counter value and an indication of the threads whose program counter is at that minimum program counter value.

8. The apparatus as claimed in claim 1, wherein the program counter checking circuitry is arranged to set a divergent flag when performance of the program counter check operation indicates that the threads of the first thread group have diverged.

9. The apparatus as claimed in claim 8, wherein said exit event occurs at least when:
    the thread processing circuitry completes execution of an allocated block of code for the first thread group;
    a currently executed instruction is an instruction flow changing instruction;

a convergence indicator is associated with the currently executed instruction.

10. The apparatus as claimed in claim 9, wherein the thread processing circuitry is arranged to determine that the program counter check condition is present when the divergent flag is set and either the currently executed instruction is an instruction flow changing instruction or the convergence indicator is associated with the currently executed instruction.

11. The apparatus as claimed in claim 10, wherein the thread processing circuitry is further arranged to determine that the program counter check condition is present when the divergent flag is unset and the currently executed instruction is an instruction flow changing instruction.

12. The apparatus as claimed in claim 10, wherein the thread processing circuitry comprises pre-check circuitry arranged, when the divergent flag is unset and the currently executed instruction is an instruction flow changing instruction, to perform a pre-check operation to determine whether the program counter check condition is present.

13. The apparatus as claimed in claim 9, wherein the register storage contents are only updated when the currently executed instruction is an instruction flow changing instruction.

14. The apparatus as claimed in claim 13, wherein the program counter checking circuitry is arranged, when performing the program counter check operation due to said convergence indicator being set, to read from the register storage the program counter information for each pending thread of the first thread group, and compare that program counter information with the common program counter as updated for the first program thread following the exit event.

15. The apparatus as claimed in claim 1, wherein when the program counter check condition is determined to be present by the thread processing circuitry, the program counter checking circuitry is triggered to perform the program counter check operation by one of the thread processing circuitry and the scheduling circuitry.

16. The apparatus as claimed in claim 1, wherein:
when the program counter check condition is determined to be present by the thread processing circuitry, the thread processing circuitry is arranged to adjust in a first direction a dependency value for the first thread group, and to issue a control signal to the program counter checking circuitry to trigger performance of the program counter check operation;
the program counter checking circuitry is arranged on completing the program counter check operation to adjust, in a second direction opposite to said first direction, the dependency value for the first thread group; and
the scheduling circuitry is prevented from selecting the first thread group for execution by the thread processing circuitry unless the dependency value for the first thread group has a value indicating that there are no pending program counter check operations for the first thread group.

17. The apparatus as claimed in claim 3, wherein the thread processing circuitry is responsive to the execution of said instruction flow changing instruction to write into a temporary storage a branch taken address, a branch not taken address, and an indication, for each active thread, of whether a branch was taken in response to executing said instruction flow changing instruction.

18. The apparatus as claimed in claim 17, wherein:
the program counter checking circuitry is responsive to execution of the program counter check operation to access the temporary storage and reconstruct, for each active thread, a program counter value computed by executing said instruction flow changing instruction;
the program counter checking circuitry is arranged, when performance of the program counter check operation indicates that the threads of the first thread group have diverged, to write the program counter value for each active thread into the register storage.

19. A method of executing thread groups on an apparatus having scheduling circuitry to select for execution a first thread group from a plurality of thread groups, and thread processing circuitry, responsive to the scheduling circuitry, to execute active threads of the first thread group in dependence on a common program counter shared between the active threads, the method comprising:
determining, responsive to an exit event from the thread processing circuitry occurring for the first thread group, whether a program counter check condition is present;
providing the thread processing circuitry with register storage to store program counter information for each thread of the first thread group;
employing program counter checking circuitry, in the presence of said program counter check condition, to perform a program counter check operation to update the common program counter and an active thread indication for the first thread group, the program counter checking circuitry having access to said register storage during performance of the program counter check operation; and
causing the scheduling circuitry to select, for execution by the thread processing circuitry, a second thread group from said plurality of thread groups other than said first thread group, whilst awaiting performance of the program counter check operation by the program counter checking circuitry for the first thread group,
wherein said register storage comprises at least one register for each thread group in said plurality of thread groups, to allow program counter information for each thread to be maintained for each of the plurality of thread groups.

* * * * *